Patented July 30, 1940

2,209,419

UNITED STATES PATENT OFFICE 2,209,419

FILMS AND OTHER MATERIALS IMPERMEABLE TO ULTRA-VIOLET RADIATION

James Henry Rooney, Arthur John Daly, and William Geoffrey Lowe, Spondon, near Derby, England, assignors to Celanese Corporation of America, a corporation of Delaware No Drawing. Application March 25, 1939, Serial No. 264,258. In Great Britain April 19, 1938

7 Claims. (Cl. 88—115)

This invention relates to the manufacture of materials which are opaque or substantially opaque to ultra-violet radiations.

Films, foils and similar materials which are opaque to ultra-violet radiations are of value for photographic purposes and also as coverings for food and other materials which may suffer damage under the influence of such radiations. Films of cellulose, cellulose derivatives and similar substances are not in themselves opaque to ultra-violet radiations but such films may be made opaque by incorporating in them substances which absorb ultra-violet radiations. The extent to which a substance absorbs ultra-violet radiations depends on the thickness of the layer of the substance through which the radiations have to pass, thicker layers of the substance absorbing more of the radiations, and also on its concentration in the film. It is necessary, therefore, in general, in the case of thin films and like materials, to incorporate relatively large proportions of substance in such materials in order that the thin layer should contain sufficient of the substance to effect a substantial absorption of ultra-violet radiation of all wave lengths. However, this has the attendant disadvantage that by the introduction of such large quantities of substance the mechanical properties of the film may be deleteriously affected.

For practical purposes it is generally sufficient that the film or similar material should absorb the range of ultra-violet radiations of wave lengths between 2000 and 4000 Angstrom units. It has now been discovered that films and other materials which absorb substantially the entire range of wave lengths between 2000 and 4000 Angstrom units may be obtained by employing, instead of a single substance in high concentration, a mixture of a substance which absorbs only part of the range of ultra-violet radiation of wave lengths between 2000 and 4000 Angstrom units with one or more other substances which absorb other parts of the said range, so that the mixture as a whole absorbs substantially the whole range in question. In this way the total absorption of ultra-violet radiations of wave lengths between 2000 and 4000 Angstrom units may be effected without incorporating large quantities of single substances in the materials.

It is in general sufficient to incorporate the mixture in a proportion of about 1 to 2 or 2 or 2.5% of the weight of the film or other article. For example, in the case of a film of thickness .004 inch containing 80% of cellulose acetate and 20% of diethyl phthalate or other plasticiser, the incorporation of a proportion of 0.47% of 4:4'-di-(dimethylamino)-benzophenone together with 0.74 of benzil (i. e. a total of only 1.21% of added substance calculated on the weight of the film) is sufficient to effect substantially total absorption over the range of wave lengths 2000–4000 Angstrom units.

It will be appreciated that mixtures of substances which individually absorb different parts of the range in question so that in combination they absorb substantially the whole range can readily be determined from the absorption spectra of substances in the ultra-violet range in question. As examples of mixtures of substances which may be employed there may be mentioned 4:4'-di-(dimethylamino)-benzophenone mixed with benzil (referred to above), with phenanthrene quinone or with anthraquinone, and also glyoxal phenylosazone mixed with dimethyl hydro-resorcin, benzil, phenanthrene quinone or anthraquinone. Other substances which in dilute form absorb part of the range of ultra-violet radiation of wave lengths 2000–4000 Angstrom units are phenylglyoxal osazone, glucosazone, di-(dialkylamino)-benzophenones in general and their dibrom and dinitro derivatives e. g. the 3:3'-dibrom and 2:2'-dinitro derivatives of 4:4'-di-(dimethylamino)-benzophenone. The compound 2:2'-dinitro-4:4'-di-dimethylamino)-benzophenone presents the especial advantage that it is quite free from fluorescence, a factor which is of especial importance where the products are to be used for photographic purposes. An advantage of 3:5'-dibrom-4:4'-di-(dimethylamino)-benzophenone is that it is colourless.

The film base may be cellulose acetate as mentioned above or any other derivative of cellulose, e. g. cellulose nitrate, cellulose formate, cellulose formate, cellulose propionate, cellulose butyrate, methyl cellulose, ethyl cellulose, butyl cellulose, benzyl cellulose, ethyl cellulose acetate and oxyethyl cellulose acetate. Again, the film may have a basis of regenerated cellulose produced by the viscose, cuprammonium or nitrocellulose processes, or may have a basis of a synthetic resin, e. g. a polymerised vinyl resin or a polymerised acrylic acid resin. The incorporation of the substances in the films is preferably effected by adding the substances to the compositions from which the films are formed.

In the case of films containing 4:4'-di-(dimethylamino)-benzophenone it has been observed that continual exposure to light tends to fade the colour of the film and it has been discovered that this difficulty may be overcome by employing a mixture of 4:4'-di-(dimethylamino)-benzophenone with 2:2'-dinitro-4:4'-di-(dimethylamino)-benzophenone. Thus a film having a basis of 80% cellulose acetate and 20% plasticiser and containing 1.25% of 4:4'-di-(dimethylamino)-benzophenone and 1.25% 2:2'-dinitro-4:4'-di-(dimethylamino)-benzophenone suffers very little colour change even after prolonged exposure in a fadeometer. This difficulty due to the fading of the colour of 4:4'-di-(dimethylamino)-benzophenone is, of course, apparent even when that substance is used in a proportion such that it in itself absorbs the whole of the wave length range 2000–4000 Angstrom units and the methods of preventing colour change referred to above are therefore equally applicable where such relatively high proportions are used.

The films may, if desired, also contain a small proportion of an organic dyestuff to absorb the blue and violet parts of the visible spectrum. Thus, a suitable organic dyestuff is benzene-azo-1-naphthalene-4-azo-p-hydroxy-benzene, which may be obtained by diazotising aniline, coupling the diazotised compound with α-naphthylamine, diazotising the product and coupling the diazotised product with phenol. Thus a suitable combination of compounds for a .004 inch thick commercial film having a basis of 80% cellulose acetate and 20% plasticiser is 1% 4:4'-di-(dimethylamino)-benzophenone, 1.5% 2:2'-dinitro-4:4'-di-(dimethylamino)-benzophenone and 0.33% of the above dyestuff, the percentages being based on the weight of the cellulose acetate. Such films are substantially entirely opaque to ultra-violet radiation of wave lengths 2000–4000 Angstrom units, the constituents do not tend to separate from the film and the orange colour is fast to light. Such films may be commercially employed as photographic filters, eye- and sun-shades, in arc-welders' goggles and similar appliances and for protecting goods in shop windows from the deleterious effects of ultra-violet radiation.

Films containing the above proportions of the constituents will resist deterioration by ultra-violet light for a considerable time and are suitable for articles subjected to severe conditions, e. g. photographic filters and arc-welders' goggles. For articles subjected to less rigorous uses, such as are exposed for example only to diffused daylight indoors, it may be sufficient to incorporate somewhat smaller proportions of the substances in the films or other materials.

Whilst the invention has been described above with particular reference to the production of films which are opaque to ultra-violet radiation, it will be appreciated that materials in other forms, e. g. materials in filamentary form or in the form of manufactured articles, may be rendered opaque to ultra-violet light by similar processes.

Having described our invention what we desire to secure by Letters Patent is:

1. Artificial foils, films and other articles containing a mixture of a di(dialkylamino)-benzophenone and a dinitro-di(dialkylamino)-benzophenone, the mixture as a whole absorbing substantially the whole of the range of ultra-violet radiation of wave-length between 2000 and 4000 Angstrom units.

2. Artificial foils, films and other articles containing a mixture of 4.4'-di(dimethylamino)-benzophenone and 2.2'-dinitro-4.4'-di(dimethylamino)-benzophenone, the mixture as a whole absorbing substantially the whole of the range of ultra-violet radiation of wave-length between 2000 and 4000 Angstrom units.

3. Artificial foils, films and other articles having a basis of an organic derivative of cellulose and containing a mixture of 4.4'-di(dimethylamino)-benzophenone and 2.2'-dinitro-4.4'-di-(dimethylamino)-benzophenone, the mixture as a whole absorbing substantially the whole of the range of ultra-violet radiation of wave-length between 2000 and 4000 Angstrom units.

4. Artificial foils, films and other articles having a basis of cellulose acetate and containing a mixture of 4.4'-di(dimethylamino)-benzophenone and 2.2'-dinitro-4.4'-di(dimethylamino)-benzophenone, the mixture as a whole absorbing substantially the whole of the range of ultra-violet radiation of wave-length between 2000 and 4000 Angstrom units.

5. Artificial foils, films and other articles containing a mixture of a di(dialkylamino)-benzophenone, a dinitro - di(dialkylamino) - benzophenone and a small proportion of an organic dyestuff which absorbs the blue and violet parts of the visible spectrum, the mixture as a whole absorbing substantially the whole of the range of ultra-violet radiation of wave-length between 2000 and 4000 Angstrom units.

6. Artificial foils, films and other articles having a basis of an organic derivative of cellulose and containing a mixture of 4.4'-di(dimethylamino) - benzophenone, 2.2'-dinitro - 4.4' - di-(dimethylamino)-benzophenone and a small proportion of benzene-azo-1-naphthalene-4-azo-p-hydroxy benzene, the mixture as a whole absorbing substantially the whole of the range of ultra-violet radiation of wave-length between 2000 and 4000 Angstrom units.

7. Artificial foils, films and similar materials having a basis of cellulose acetate and containing about 1% of 4:4'-di-(dimethylamino)-benzophenone, about 1.5% of 2:2'-dinitro-4:4'-di-(dimethylamino) - benzophenone, and about 0.33% of benzene-azo-1-naphthalene-4-azo-p-hydroxy-benzene.

JAMES HENRY ROONEY.
ARTHUR JOHN DALY.
WILLIAM GEOFFREY LOWE.

CERTIFICATE OF CORRECTION.

Patent No. 2,209,419. July 30, 1940.

JAMES HENRY ROONEY, ET AL.

It is hereby certified that error appears in the printed specification of the above numbered patent requiring correction as follows: Page 1, first column, line 51, for "1 to 2 or 2 or 2.5%" read --1 to 2 or 2.5%--; and second column, line 3, for "0.74" read --0.74%--; line 34, for "3:5'" read --3:3'--; line 39, strike out the words and comma "cellulose propionate," and that the said Letters Patent should be read with this correction therein that the same may conform to the record of the case in the Patent Office.

Signed and sealed this 27th day of August, A. D. 1940.

(Seal)

Henry Van Arsdale,
Acting Commissioner of Patents.